(12) United States Patent
Quirein et al.

(10) Patent No.: US 9,784,876 B2
(45) Date of Patent: Oct. 10, 2017

(54) CHARACTERIZING A DOWNHOLE ENVIRONMENT USING STIFFNESS COEFFICIENTS

(71) Applicant: HALLIBURTON ENERGY SERVICES, INC., Houston, TX (US)

(72) Inventors: John Andrew Quirein, Georgetown, TX (US); Arthur Chuen Hon Cheng, Houston, TX (US); Mahmoud Eid Selim, Al-Khobar (SA)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 14/771,769

(22) PCT Filed: Apr. 30, 2014

(86) PCT No.: PCT/US2014/036155
§ 371 (c)(1),
(2) Date: Aug. 31, 2015

(87) PCT Pub. No.: WO2015/167527
PCT Pub. Date: May 11, 2015

(65) Prior Publication Data
US 2016/0131787 A1    May 12, 2016

(51) Int. Cl.
*G01V 1/50* (2006.01)
*G01V 5/10* (2006.01)
(Continued)

(52) U.S. Cl.
CPC ............ *G01V 1/50* (2013.01); *E21B 43/26* (2013.01); *E21B 49/00* (2013.01); *G01V 5/101* (2013.01); *G01V 2210/6242* (2013.01)

(58) Field of Classification Search
CPC ... G01V 1/50; G01V 2210/6242; G01V 5/101
See application file for complete search history.

(56) References Cited

U.S. PATENT DOCUMENTS

| 5,285,683 | A | * | 2/1994 | Abass | E21B 43/26 |
| | | | | | 166/308.1 |
| 5,335,724 | A | * | 8/1994 | Venditto | E21B 23/006 |
| | | | | | 166/250.1 |

(Continued)

OTHER PUBLICATIONS

Higgins, S., et al., "Anisotropic Stress Models Improve Completion Design in Baxter Shale", SPE 115736, pp. 1-10, 2008 SPE Annual Technical Conference and Exhibition, Denver, Colorado, Sep. 21-24, 2008.

(Continued)

*Primary Examiner* — Hyun Park
*Assistant Examiner* — Liam R Casey
(74) *Attorney, Agent, or Firm* — Alan Bryson; Parker Justiss, P.C.

(57) ABSTRACT

A method that includes obtaining log data of a downhole formation, and characterizing the downhole formation by determining stiffness coefficients including $C_{33}$, $C_{44}$, $C_{66}$, $C_{11}$, $C_{12}$, and $C_{13}$. $C_{13}$ is a function of $C_{33}$, $C_{44}$, $C_{66}$, and at least one of a kerogen volume and a clay volume derived from the log data. In another method or system, $C_{13}$ is derived based at least in part on $C_{11}$ calculated as $C_{11}=k_1[C_{33}+2(C_{66}-C_{44})]+k_2$ or $C_{33}$ calculated as $C_{33}=((C_{11}-k_2)/k_1)-2(C_{66}-C_{44})$, where $k_1$ and $k_2$ are predetermined constants. In another method or system, $C_{13}$ is derived in part from at least one of a kerogen volume derived from the log data, a clay volume derived from the log data, $C_{11}$ calculated as $C_{11}=k_1[C_{33}+2(C_{66}-C_{44})]+k_2$, or $C_{33}$ calculated as $C_{33}=((C_{11}-k_2)/k_1)-2(C_{66}-C_{44})$, where $k_1$ and $k_2$ are predetermined constants.

24 Claims, 12 Drawing Sheets

(51) Int. Cl.
*E21B 43/26* (2006.01)
*E21B 49/00* (2006.01)

(56) References Cited

U.S. PATENT DOCUMENTS

| | | | |
|---|---|---|---|
| 6,351,991 | B1 | 3/2002 | Sinha |
| 6,714,480 | B2 | 3/2004 | Sinha et al. |
| 2009/0210160 | A1* | 8/2009 | Suarez-Rivera ........ G01V 11/00 702/6 |
| 2009/0225628 | A1 | 9/2009 | Sayers |
| 2009/0234622 | A1 | 9/2009 | Sengupta et al. |
| 2010/0312534 | A1 | 12/2010 | Xu et al. |
| 2011/0022320 | A1* | 1/2011 | Abousleiman ........ E21B 49/006 702/12 |
| 2011/0186723 | A1* | 8/2011 | Chalitsios .............. G01N 23/09 250/269.4 |
| 2014/0365420 | A1* | 12/2014 | Jocker .................... G01V 1/48 706/52 |
| 2015/0185347 | A1* | 7/2015 | Nemeth .................. G01V 1/36 702/18 |
| 2016/0290113 | A1* | 10/2016 | Kisra ..................... E21B 47/00 |

OTHER PUBLICATIONS

Waters, G. A., et al., "The Effect of Mechanical Properties Anisotropy in the Generation of Hydraulic Fractures in Organic Shales", SPE 146776, pp. 1-25, SPE Annual Technical Conference and Exhibition, Denver, Colorado, Oct. 30-Nov. 2, 2001.
Norris, A. et. al, "Weak Elastic Anisotropy and Tube Wave", Geophysics, Aug. 1993, vol. 58, No. 8, pp. 1091-1098.
Schoenberg, Michael., et al., "Introducing Annie: A Simple Three Parameter Anisotropic Velocity Model for Shales", Journal of Seismic Exploration 5, (1996), pp. 35-49.
PCT International Search Report and Written Opinion, dated Jan. 8, 2015, Appl No. PCT/US2014/036155, "Characterizing a Downhole Environment Using Stiffness coefficients", filed Apr. 30, 2014, 10 pgs.

\* cited by examiner

CHARACTERIZING A DOWNHOLE ENVIRONMENT USING STIFFNESS COEFFICIENTS

BACKGROUND

Organic shale reservoirs have very low permeabilities, often necessitating significant fracturing operations to promote efficient production. The stimulated fracture system produced by such operations will be strongly influenced by the extensive horizontal laminations that pervade shale reservoirs. More specifically, these laminations will strongly influence the hydraulic fracture height because of the differences in rock mechanical properties normal and parallel to the bedding planes. In order to accurately predict fracturing height from logs in this environment, these mechanical property differences need to be accurately characterized and taken into account.

During oil and gas exploration and production, many types of information are collected and analyzed. This information is used to determine the quantity and quality of hydrocarbons in a reservoir, and to develop or modify strategies for hydrocarbon production. One type of information that is routinely collected is acoustic log data. In acoustic logging an acoustic source (transmitter) is positioned at a distance from an array of spaced-apart receivers. An acoustic signal is transmitted by the acoustic source to propagate along the borehole wall and be received at the receivers. Measurements are repeated every few inches as the tool descends or ascends in the borehole. The received acoustic signals may be processed to determine first-arrival times or even frequency-dependent (and propagation mode-dependent) wave slowness values to be stored and/or communicated to the surface.

The slowness values for certain propagation modes (compressional wave propagation, shear wave propagation, and Stoneley wave propagation) can be converted into estimates of corresponding stiffness coefficients, but these stiffness coefficients alone result only in an incomplete characterization of the formation's mechanical properties. The well-known ANNIE model postulates that certain empirically-observed relationships may be used to estimate the remaining stiffness coefficients and thereby provide a complete characterization of the formation's mechanical properties. It has now been found that, at least for certain formations, ANNIE-based estimates are incorrect.

BRIEF DESCRIPTION OF THE DRAWINGS

Accordingly, there is disclosed herein a formation characterization method employing a modified ANNIE model, and certain related methods and systems. In the drawings.

Figure 1:
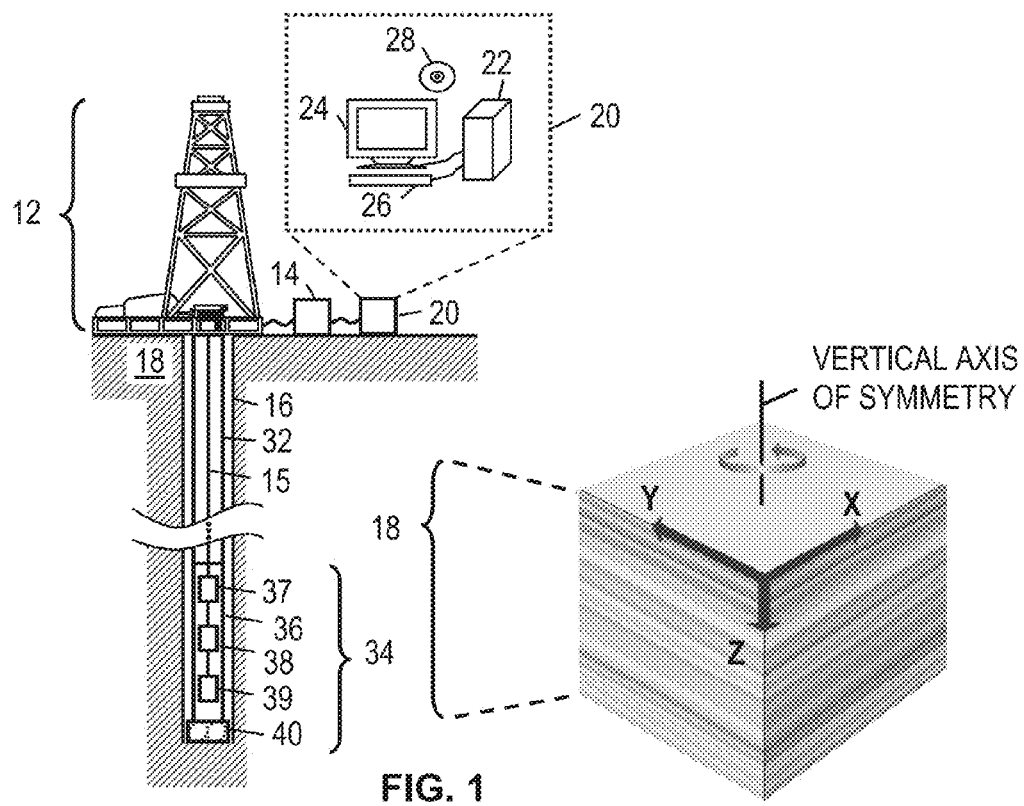
FIG. 1 shows an illustrative logging-while-drilling (LWD) tool survey environment.

It should be understood, however, that the specific embodiments given in the drawings and detailed description thereto do not limit the disclosure. On the contrary, they provide the foundation for one of ordinary skill to discern the alternative forms, equivalents, and modifications that are encompassed together with one or more of the given embodiments in the scope of the appended claims.

DETAILED DESCRIPTION

Disclosed herein is a modified ANNIE model and related methods and systems. In contrast to the traditional ANNIE model, the values of the stiffness coefficients, $C_{ij}$, determined by the modified ANNIE model are valid for wider range of reservoirs including shale reservoirs with shear anisotropy (the ratio of vertical to horizontal propagating shear velocity)<1 and with the horizontal Poisson's Ratio greater than the vertical Poisson's Ratio. Further, the values of $C_{ij}$ determined by the modified ANNIE model are also valid for a transversely isotropic medium in which the vertical Poisson's Ratio is greater than or equal to the horizontal Poisson's Ratio. Accordingly, the modified ANNIE model enables more accurate estimations of the minimum and maximum horizontal stress from logging data compared to the ANNIE model. In at least some embodiments, fracture closure pressures and related well completion operations are determined using at least some of the values for $C_{ij}$ determined by the modified ANNIE model. As described herein, profiling horizontal stress as a function of depth is useful for selecting "sweet spots" to drill a horizontal well, for selecting intervals to perforate, and/or for other operations.

Before proceeding, a few remarks about the stiffness coefficients, and the ANNIE model are in order. Briefly, according to the theory of elasticity, the elastic response of a body to an applied load may be obtained using the principle of energy conservation, whereby the applied stress causes deformations, which changes the strain energy within the body. Mathematically, the stress ($\tau$) at each point of a body is expressed as the change in strain energy associated to the change in the displacement gradient. This in turn, is proportional to the resulting strain ($\epsilon$). The resulting expressions (Equation 1 and Equation 2) correspond to the generalized Hooke's law (in tensorial notation), and indicate a proportional relationship between stress components ($\tau_{ij}$) and strain components ($\epsilon_{ij}$):

$$\tau_{ij} = C_{ijkl}\varepsilon_{kl}; \quad \text{Equation 1}$$

where $$C_{ijkl} = \begin{bmatrix} C_{11} & C_{12} & C_{13} & C_{14} & C_{15} & \cdots \\ C_{21} & C_{22} & C_{23} & C_{24} & C_{25} & \cdots \\ C_{31} & C_{32} & C_{33} & C_{34} & C_{35} & \cdots \\ C_{41} & C_{42} & C_{43} & C_{44} & C_{45} & \cdots \\ C_{51} & C_{52} & C_{53} & C_{54} & C_{55} & \cdots \\ \cdots & \cdots & \cdots & \cdots & \cdots & \cdots \end{bmatrix}. \quad \text{Equation 2}$$

In accordance with tradition, the elements of the tensor employ the conventional matrix indexing scheme (IJ means row I, column J), whereas the lower case indices used elsewhere represent the three dimensions (e.g., i, j, k, and l can each take on the values 1, 2, or 3 to represent the corresponding Cartesian axes x, y, or z). The resulting stiffness tensor can have 81 rows and columns, but as explained below many of the entries are not required.

The coefficient of proportionality, $C_{ijkl}$, in Equations 1 and 2 is the elastic-tensor or stiffness-tensor. For heterogeneous bodies, $C_{ijkl}$ is a function of the position in the body. For homogeneous bodies, $C_{ijkl}$ is a constant and independent of position, yielding symmetry properties and conditions of positive definiteness that reduce the number of possibly independent components to 21. The number of independent components of the tensor may be reduced further, depending on material symmetries. For orthotropic symmetry the material response is characterized by nine independent stiffness coefficients, namely, $C_{11}$, $C_{22}$, $C_{33}$, $C_{44}$, $C_{55}$, $C_{66}$, $C_{12}$, $C_{13}$, $C_{23}$, where subscript I ranges from 1 to 6 representing, in order, ij=11, 22, 33, 23, 31, 12, and subscript J ranges from 1 to 6 to represent, in order, kl=11, 22, 33, 23, 31, 12. For transverse isotropic behavior (i.e., rotational symmetry) the material response is characterized by five independent material constants, namely, $C_{11}=C_{22}$, $C_{33}$, $C_{44}=C_{55}$, $C_{12}$, $C_{13}=C_{23}$; where $C_{66}$ is a function of the others. For isotropic symmetry, there is no directional bias. Accordingly, the material response for isotropic symmetry may be characterized with exactly two independent material constants ($C_{11}=C_{22}=C_{33}$, $C_{12}=C_{13}=C_{23}$; where $C_{44}=C_{55}=C_{66}$ are a function of the others).

Based on the aforementioned symmetries, the stiffness matrix for anisotropic materials with orthotropic symmetry may be expressed as follows:

$$C_{ijkl} = \begin{bmatrix} C_{11} & C_{12} & C_{13} & 0 & 0 & 0 \\ C_{12} & C_{22} & C_{23} & 0 & 0 & 0 \\ C_{13} & C_{23} & C_{33} & 0 & 0 & 0 \\ 0 & 0 & 0 & C_{44} & 0 & 0 \\ 0 & 0 & 0 & 0 & C_{55} & 0 \\ 0 & 0 & 0 & 0 & 0 & C_{66} \end{bmatrix}.$$

Equation (3)

The five independent elastic coefficients of the transversely isotropic media are $C_{11}$, $C_{33}$, $C_{12}$, $C_{13}$, and $C_{44}$. Alternatively, these may be selected as follows, $C_{33}$, $C_{12}$, $C_{13}$, $C_{44}$, and $C_{66}$, because $C_{66}$ may be represented as a function of $C_{11}$ and $C_{12}$. Processing of sonic data logs from vertical wells provides three of these independent coefficients: $C_{33}$, $C_{44}=C_{55}$, and $C_{66}$. More specifically, for vertical wells with flat bedding planes, $C_{33}$ is derived from the slowness of the vertically propagating P-wave, $C_{44}$ is derived from the vertically polarized shear wave, and $C_{66}$ is derived from the horizontally polarized shear wave. See e.g., A. Norris and B. Sinha, Weak Elastic Anisotropic and Tube Wave, Geophysics, 58 (8): 1091-1098 (1993). Consequently, two additional coefficients $C_{12}$ and $C_{13}$ remain to be determined for a complete characterization of transversely isotropic material properties.

The ANNIE model is based on the assumption of two relationships between the other elastic properties as follows:

$C_{12}=C_{13}$; and \hfill Equation (4)

$C_{13}=(C_{33}-2C_{44})$. \hfill Equation (5)

Further, the values of $C_{11}$ and $C_{12}=C_{13}$ may be expressed as follows:

$C_{12}=C_{13}=(C_{33}-2C_{44})=(C_{11}-2C_{66})$; and \hfill Equation (6)

$C_{11}=(C_{33}-2C_{44}+2C_{66})$. \hfill Equation (7)

See e.g., Schoenberg et al., Introducing Annie: A Simple Three Parameter Anisotropic Velocity Model for Shales: *Journal of Seismic Exploration,* 5:35-49 (1996); Higgins et al., Anisotropic Stress Models Improve Completion Design in Baxter Shale, SPE 115736 (2008); and Waters et al., The Effect of Mechanical Properties Anisotropy in the Generation of Hydraulic Fractures in Organic Shales, SPE 146776 (2011).

In contrast, the disclosed modified ANNIE model calculates $C_{11}$, $C_{12}$, and $C_{13}$ as:

$C_{11}=k_1[C_{33}+2(C_{66}-C_{44})]+k_2$; \hfill Equation (8)

$C_{12}=C_{11}-2C_{66}$; \hfill Equation (9)

$C_{13}=k_3(C_{11}-2C_{66})k_4$; \hfill or Equation (10a)

$C_{13}=k_5C_{33}+k_6C_{44}+k_7C_{66}$; or \hfill Equation (10b)

$C_{13}=k_8(C_{11}-2C_{66})k_9+k_{kerogen}V_{kerogen}+k_{clay}V_{clay}$; or \hfill Equation (10c)

$C_{13}=k_{10}C_{33}+k_{11}C_{44}+k_{12}C_{66}+k_{13}+k_{kerogen}V_{kerogen}+k_{clay}V_{clay}$ \hfill Equation (10d)

where the values of $k_1$-$k_{13}$, $k_{kerogen}$ and $k_{clay}$ correspond to predetermined constants obtained by comparing predicted or simulated results with measurement data (e.g., core sample data), and where $v_{kerogen}$ and $v_{clay}$ are kerogen and clay volume estimates obtained from log data (e.g., nuclear, NMR, or resistivity log data). For example, $k_1$-$k_{13}$, $k_{kerogen}$ and $k_{clay}$ may be obtained in a laboratory by measuring stiffness properties of core samples and fitting curves to the relationships between the different stiffness properties.

In the modified ANNIE model, Equations 10a and 10b are alternatives that can be derived from each other, and Equations 10c-10d are alternatives that can be derived from each other. In at least some embodiments, the decision regarding which $C_{13}$ option to use is made based on the availability of the kerogen and clay volume estimates.

With the values $C_{33}$, $C_{44}=C_{55}$, and $C_{66}$ obtained from sonic logging data and $C_{11}$, $C_{12}$, and $C_{13}$ determined from equations 8-10, the elastic moduli (sometimes referred to as "dynamic moduli") can be determined in both the vertical and horizontal directions as:

$$E_v = C_{33} - \frac{2C_{13}^2}{C_{11}+C_{12}};$$

Equation (11)

$$E_h = \frac{(C_{11}-C_{12})*(C_{11}C_{33}-2C_{13}^2+C_{12}C_{33})}{C_{11}C_{33}-C_{13}^2};$$

Equation (12)

$$v_v = \frac{C_{13}}{C_{11}+C_{12}}; \text{ and}$$

Equation (13)

$$v_h = \frac{C_{33}C_{12}-C_{13}^2}{C_{33}C_{11}-C_{13}^2},$$

Equation (14)

where $E_v$ is the vertical Young's Modulus (psi), $E_h$ is the horizontal Young's Modulus (psi), $v_v$ is the vertical Poisson's Ratio, and $v_h$ is the horizontal Poisson's Ratio. From these values, the minimum horizontal stress for an isotropic medium may be calculated as:

$$\sigma_{Hmin} = \frac{E_h}{E_v}\frac{v_v}{1-v_h}[\sigma_v - \alpha(1-\xi)p_p] + \alpha p_p + \frac{E_h}{1-v_h^2}\epsilon$$

$$H_{min} + \frac{E_h v_h}{1-v_h^2}\epsilon H_{max},$$

Equation (15)

where $\sigma_v$ is the overburden stress gradient (psi/ft), $\alpha$ is Biot's elastic constant, $\xi$ is a poroelastic constant, $p_p$ is a pore pressure gradient, $\epsilon H_{max}$ is the maximum horizontal strain, and $\epsilon H_{min}$ is the minimum horizontal strain. In at least some embodiments, fracture closure pressures and related well completion operations are determined based on values computed using equations 8-16.

The disclosed stiffness analysis approach can be appreciated in the context of logging-while-drilling (LWD) survey environments and wireline logging survey environments. FIG. 1 shows an illustrative LWD survey environment. In FIG. 1, a drilling assembly 12 enables a drill string 32 to be lowered and raised in a borehole 16 that penetrates a formation 18. In at least some embodiments, the formation 18 is determined or modeled to be transversely isotropic with a vertical axis of symmetry (TIV) (the z direction is parallel to the vertical axis in FIG. 1).

At the lower end of the drill string 32, a bottomhole assembly 34 with a drill bit 40 removes material from the formation 18 using known drilling techniques. The bottomhole assembly 34 also includes a logging tool 36 that collects, for example, sonic log data as described herein. The logging tool 36 includes transmitter(s) 39, receiver(s) 38, and a communication interface 37. The transmitter(s) 39 and receiver(s) 38 enable collection of sonic logging data, which may be conveyed to earth's surface via a wired or wireless communication interface 15. The communication interface 15 also may enable downhole communications (e.g., logging instructions or control parameters) from earth's surface to the logging tool 36. Example sonic log data that may be collected includes propagation velocities of compressional and shear waves, sonic waveforms, and derivable values such as acoustic impedance.

At earth's surface, a surface interface 14 receives the collected log data and conveys the collected log data to a computer system 20. In some embodiments, the surface interface 14 and/or the computer system 20 may perform various operations such as formatting, storing and/or processing the data. Further, the computer system 20 performs stiffness analysis based in part on the collected log data and the modified ANNIE model described herein. For example, in at least some embodiments, the computer system 20 includes a processing unit 22 that performs the disclosed stiffness analysis operations by executing software or instructions obtained from a local or remote non-transitory computer-readable medium 28. The computer system 20 also may include input device(s) 26 (e.g., a keyboard, mouse, touchpad, etc.) and output device(s) 24 (e.g., a monitor, printer, etc.). Such input device(s) 26 and/or output device(s) 24 provide a user interface that enables an operator to interact with the logging tool 36 and/or software executed by the processing unit 22. For example, the computer system 20 may enable an operator may select stiffness analysis options, to view collected logged data, to view stiffness analysis results, and/or to perform other tasks.

Figure 2:
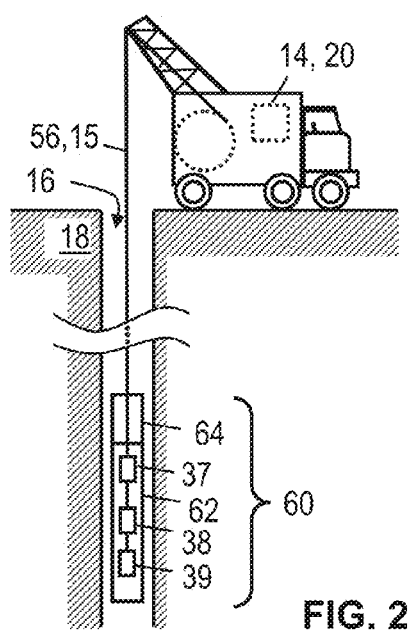
FIG. 2 shows an illustrative wireline tool survey environment.

At various times during the drilling process, the drill string 32 shown in FIG. 1 may be removed from the borehole 16. With the drill string 32 removed, wireline logging operations may be performed as shown in the wireline logging survey environment of FIG. 2. In FIG. 2, a wireline logging string 60 is suspended in borehole 16 by a cable 56 having conductors for conveying power to logging tool 62 and tools 64. The cable 56 may also be used as a communication interface 15 for uphole and/or downhole communications. The logging tool 62 includes transmitter(s) 39 and receiver(s) 38 to collect log data (e.g., sonic log data), and a communication interface 37 to convey the collected log data to earth's surface. The communication interface 37 also may enable the logging tool 62 to receive instructions or control parameters from earth's surface. The tools 64 may correspond to other logging tools that are part of the wireline logging string 60.

Figure 3:
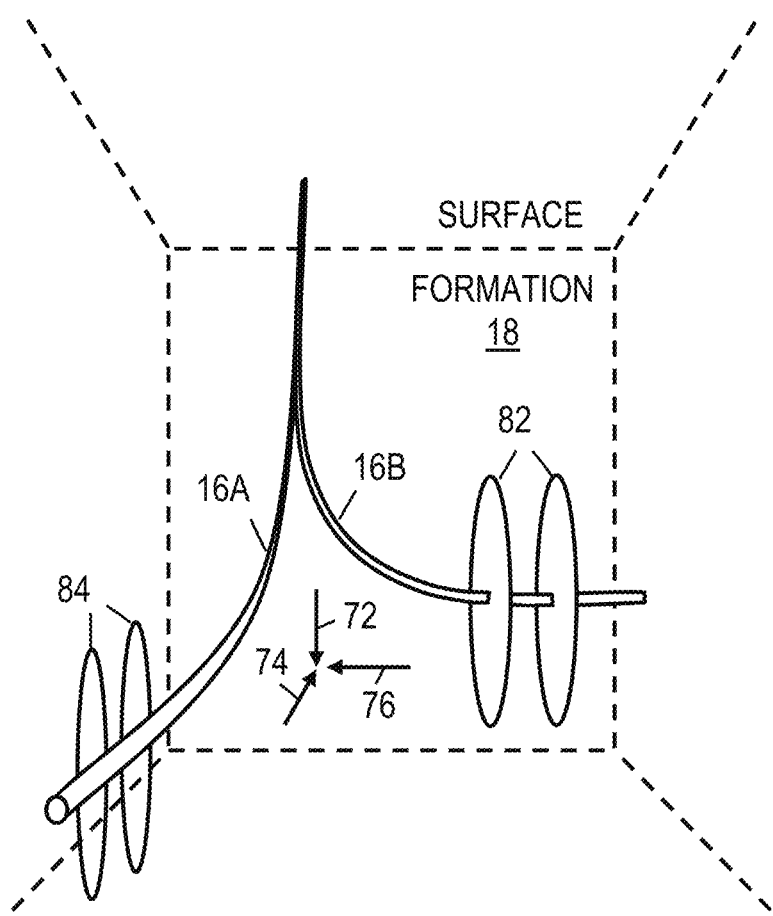
FIG. 3 shows an illustrative downhole environment.

FIG. 3 shows an illustrative downhole environment, in which boreholes 16A and 16B penetrate the formation 18 and extend horizontally in different directions. Along borehole 16A, longitudinal fractures 84 are represented at a wellbore azimuth of 0°. Meanwhile, transverse fractures 82 are represented along borehole 16B at a wellbore azimuth of 90°. Arrows 72, 74, and 76 represent existent stress in the formation 18. More specifically, arrow 72 corresponds to vertical stress, arrow 74 corresponds to a maximum horizontal stress, and arrow 76 corresponds to a minimum horizontal stress. In accordance with at least some embodiments, the disclosed stiffness analysis approach can be used to determine the minimum horizontal stress represented by arrow 76. From the determined minimum horizontal stress, a fracture closure pressure, frac operations, and well completion operations can be determined.

Figure 4A:
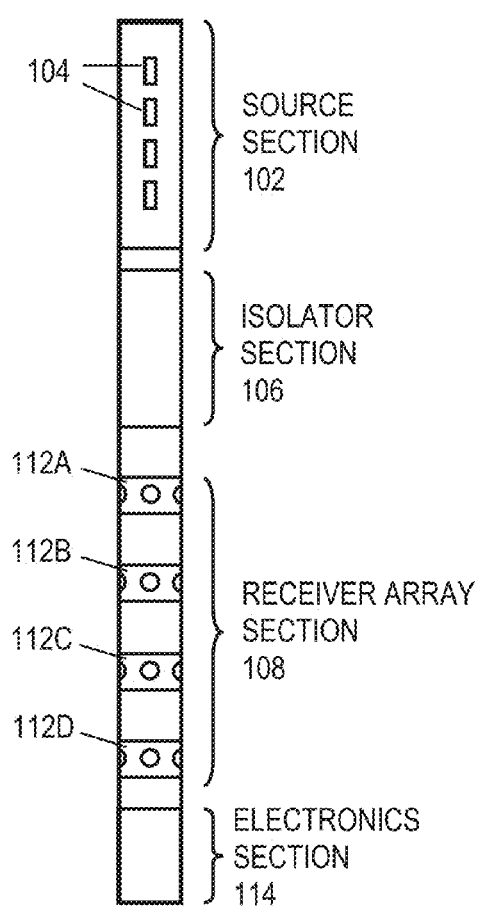
FIGS. 4A-4D show illustrative logging tools.

FIG. 4A shows a block diagram of an illustrative sonic logging tool 100. The sonic logging tool 100 may correspond to, for example, logging tool 36 of FIG. 1 or logging tool 62 of FIG. 2. As shown, the sonic logging tool 100 includes a source section 102, an isolator section 106, a receiver array section 108, and an electronics section 114.

The electronics section 114 may include various components to control acoustic source output provided by source section 102, to process signals collected by the receiver array section 108, and to communicate with other downhole tools and/or with a surface computer. Example components of electronics section 114 include digital signal processors, microcontrollers, memories, analog-to-digital converters, digital-to-analog converters, modems, and power amplifiers.

In at least some embodiments, the electronics section 114 directs operations of the sonic logging tool 100 by controlling the triggering and timing of one or more acoustic transmitters 104 in source section 102. As an example, a controller in the electronics section 114 may cause one or more of the acoustic transmitters 104 to fire periodically, thereby producing acoustic pressure waves that propagate through fluid in borehole 16 and into the surrounding formation 18. At the borehole boundary, some of the acoustic energy is converted into compressional waves that travel through the formation, and into shear waves that propagate along the interface between fluid in the borehole 16 and the formation 18. As these waves propagate past the receiver array section 108, they cause pressure variations that can be detected by individual receiver array elements 112A-112D. The signals collected by the receiver array section 108 can be processed downhole and/or at the surface to determine formation characteristics.

Figure 4B:
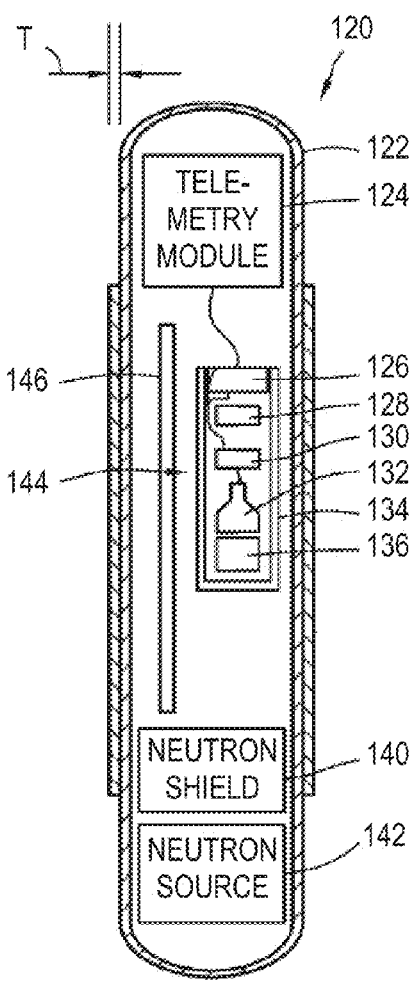

FIG. 4B shows a cross-section of an illustrative nuclear logging tool 120. The nuclear logging tool 120 may correspond to, for example, logging tool 36 of FIG. 1 or logging tool 62 of FIG. 2. In FIG. 4B, a pressure vessel 122 houses components such as the telemetry module 124, borehole shield 146, gamma detector 144, neutron shield 140 and neutron source 142. Any neutron source capable of producing and/or releasing neutrons with sufficient energy may be used. While the gamma detector 144 is shown above the neutron source 142, in other embodiments the gamma detector 144 is below the neutron source 142. Moreover, multiple gamma detectors may be used. The gamma detector 144 detects arrival of, and energy of, gammas created by interactions of neutrons with atoms both in the formation 18, as well as atoms that make up the various components of the nuclear logging tool 120. As an example, the gamma detector 144 may comprise a metallic Dewar flask 134 sealed by a stopper 126, and within the Dewar flask 134 reside a scintillation crystal 136 (e.g., a 3 inch by 4 inch bismuth germinate scintillation crystal), a photomultiplier tube 132 in operational relationship to the crystal 136, a processor 130 coupled to the photomultiplier tube 132, and eutectic material 128. As gammas are incident upon/within the scintillation crystal 136, the gammas interact with the crystal 136 and flashes of light are emitted. Each flash of light itself is indicative of an arrival of a gamma, and the intensity of the light is indicative of the energy of the gamma. The output of the photomultiplier tube 132 is proportional to the intensity of the light associated with each gamma arrival, and the processor 130 quantifies the output as gamma energy and relays the information to a surface computer (e.g., computer system 20) by way of the telemetry module 124. In order to reduce the irradiation of the gamma detector 144 by energetic neutrons from the neutron source 142, the neutron shield 140 separates the neutron source 142 from the gamma detector 144. The energetic neutrons are focused to some extent toward the side of the nuclear logging tool 120 that contacts with the borehole wall.

Figure 4C:
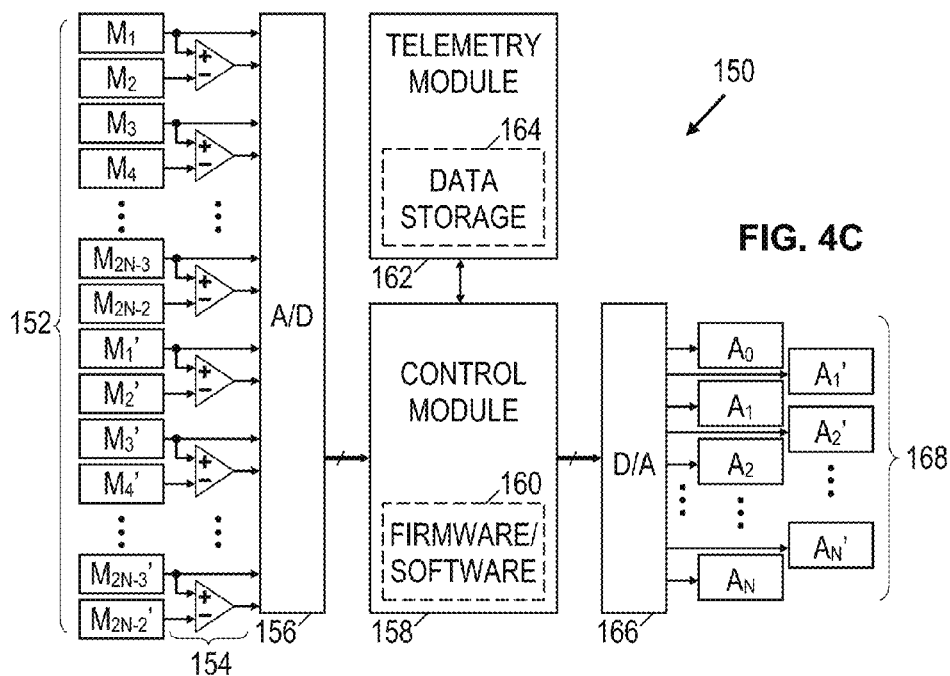

FIG. 4C shows a functional block diagram of components for a resistivity logging tool 150. The resistivity logging tool 150 may correspond to, for example, logging tool 36 of FIG. 1 or logging tool 62 of FIG. 2. In FIG. 4C, a control module 158 governs the operation of the resistivity logging tool 150 in accordance with software and/or firmware 160 stored in internal memory. The control module 158 also couples to telemetry module 162 to receive commands and/or to provide measurement data to a surface computer (e.g., computer system 20) or controller. Control module 158 further connects to digital-to-analog converter 166 to drive current electrodes 168, and connects to analog-to-digital converter 156 to obtain voltage measurements via monitor electrodes 152. Control module 158 can be, for example, a general purpose processor, a digital signal processor, a programmable gate array, or an application specific integrated circuit. Telemetry module 162 receives and stores measurement data in storage 164, which may correspond to non-volatile memory, and further operates as a communications interface between the control module 158 and other downhole or surface components.

FIG. 4C shows 2N+1 current electrodes (guard electrodes $A_0, A_1, A_2, \ldots A_{N-1}, A_1', A_2', \ldots A_{N-1}'$ and return electrodes $A_N$ and $A_N'$) 168 being independently driven via digital-to-analog converter 166. In some embodiments, the guard electrodes are electrically connected in pairs, i.e., electrode $A_1$ is connected to electrode $A_1'$ by an electrical conductor, electrode $A_2$ is connected to electrode $A_2'$, etc. Moreover, the return electrodes are electrically connected (i.e., electrode $A_N$ is conductively coupled to electrode $A_N'$). In such alternative embodiments, the digital-to-analog converter 166 can be simplified to drive only one electrode in each pair. Similarly, the monitor electrodes 152 can be electrically connected in pairs, i.e., with electrode $M_1$ connected to $M_1'$, electrode $M_2$ connected to $M_2'$, etc. Each monitor electrode can be individually driven/sensed and the control module 158 can collect the pair-wise measurements by appropriately combining the individual electrode currents and voltages.

In some embodiments, a series of differential amplifiers 154 provides the analog-to-digital converter 156 with differential voltage measurements between monitor electrode dyads, e.g., between monitor electrodes $M_1$ and $M_2$, between $M_3$ and $M_4$, ..., and between $M_{2N-3}$ and $M_{2N-2}$. Where the monitor electrodes are not connected in pairs, the analog-to-digital converter 156 further measures the voltages between monitor electrodes $M_1'$ and $M_2'$, between $M_3'$ and $M_4'$, ..., and between $M_{2N-3}'$ and $M_{2N-2}'$. For completeness, the analog-to-digital converter 156 may also measure the voltages of the odd-numbered monitor electrodes ($M_1$, $M_3$, ... $M_{2N-3}$, $M_1'$, $M_3'$, ..., $M_{2N-3}'$). Other non-differential measurements could alternatively be used, such as the voltages of the even-numbered monitor electrodes, or the average voltage for each monitor electrode dyad. Given both the differential and non-differential measurements, the resistivity logging 150 can determine the voltage for each monitor electrode 152.

Figure 4D:
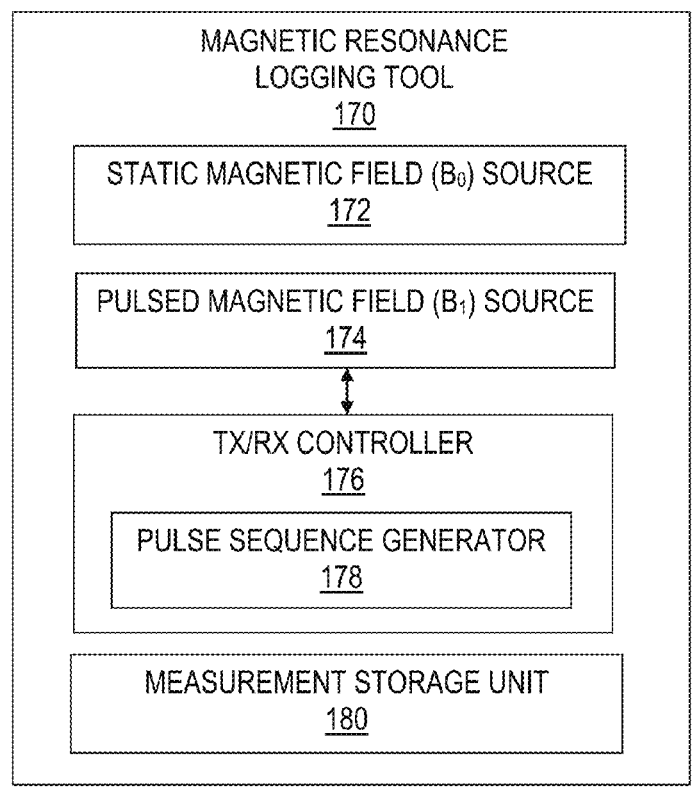

FIG. 4D shows a block diagram of components for a magnetic resonance logging tool 170. The magnetic resonance logging tool 170 may correspond to, for example, logging tool 36 of FIG. 1 or logging tool 62 of FIG. 2. In some embodiments, the magnetic resonance logging tool 170. As shown, the magnetic resonance logging tool 170 includes a static magnetic field ($B_0$) source 172, such as one or more strong, permanent magnets (e.g., samarium cobalt magnets). The magnetic resonance logging tool 170 also includes a pulsed magnetic field ($B_1$) source 174 to emit pulses of an alternating radio frequency (RF) magnetic field using one or more antennas with suitable electronics. Note that such antennas and electronics can act in a dual role, also functioning to receive and detect spin echo signals. Alternatively such receiving can be done with separate antennas and electronics.

The magnetic resonance logging tool 170 further includes a transmit/receive controller 176 with a pulse sequence generator 178. The pulse sequence generator 178 directs the pulsed magnetic field source 174 to output a particular pulse sequence and to listen for magnetic resonance phenomena related to the pulse sequence. Example pulses include one or more saturation pulses, an inversion pulse, and one or more detection sequences. The detection sequences may correspond to a free-induction decay (FID) pulse, a Carr-Purcell sequence, a Carr-Purcell-Meiboom-Gill (CPMG) sequence, or other detection sequence. It should be understood that the refocusing pulse or pulses in these sequences are not restricted to 180 degrees.

The NMR tool 170 also includes a measurement storage unit 180 to store magnetic resonance phenomena measurements. The measurement storage unit 180 is accessible via wired or wireless data transmissions to a surface computer (e.g., computer system 20). For example, the stored measurements may be used to derive $T_1$ distributions, $T_2$ distributions or other formation parameters from which kerogen and clay volume estimates may be derived.

Figure 5:
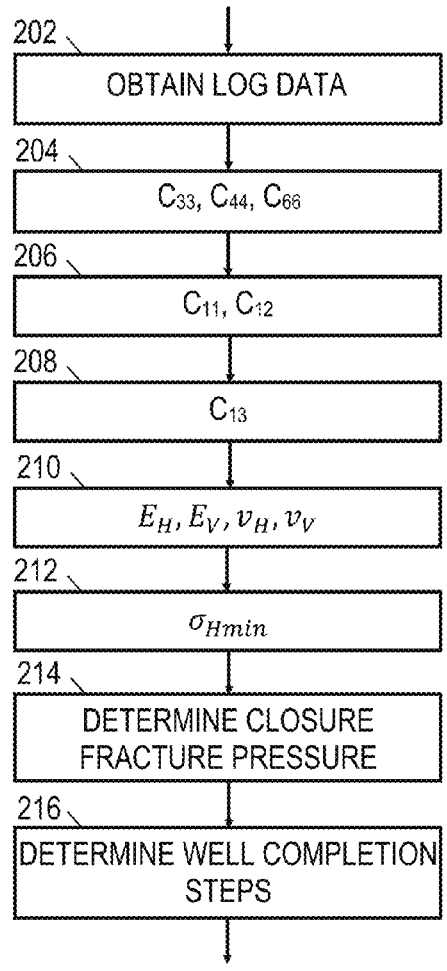
FIG. 5 is a flowchart of an illustrative method employing a modified ANNIE model.

FIG. 5 is a flowchart of an illustrative stiffness analysis method 200. The method 200 may be performed by a computer system (e.g., computer system 20 in FIG. 1) in communication with one or more logging tools (e.g., tools 100, 120, 150, 170 in FIGS. 4A-4D). At block 202, log data is obtained (e.g., sonic log data, nuclear log data, resistivity log data, magnetic resonance log data, etc.). At block 204, values for stiffness coefficients $C_{33}$, $C_{44}$, and $C_{66}$ are determined. For example, for a vertical or near vertical well scenario, $C_{33}$ may be determined from vertically propagating P-wave measurements, $C_{44}$ may be determined from vertically polarized shear wave measurements, and $C_{66}$ may be determined from horizontally polarized shear wave measurements. At block 206, values for stiffness coefficients $C_{11}$ and $C_{12}$ are determined. In at least some embodiments, $C_{11}$ is determined based on Equation 8, and $C_{12}$ is determined based on Equation 9.

In alternative embodiments, for a horizontal well or near horizontal well scenario, block 204 may obtain $C_{11}$, $C_{66}$, and $C_{44}$ from sonic wave measurements. $C_{33}$ can then be obtained at block 206 using a modified version of Equation 8:

$$C_{33}=((C_{11}-k_2)/k_1)-2(C_{66}-C_{44}). \qquad \text{Equation (16)}$$

At block 208, a value for $C_{13}$ is determined. In at least some embodiments, $C_{13}$ is determined based on one of Equations 10a-10d, where log data from various logging tools (e.g., tools 100, 120, 150, 170 in FIGS. 4A-4D) is used to determine at least some of the values for $k_3$-$k_{13}$, $k_{kerogen}$, and/or $k_{clay}$.

At block 210, values for $E_v$, $E_h$, $v_v$, $v_h$ are determined. In at least some embodiments, the values for $E_v$, $E_h$, $v_v$, $v_h$ are based on Equations 11-14. At block 212, a value for the minimum horizontal stress is determined. In at least some embodiments, the minimum horizontal stress is determined based on Equation 15. At block 214, a closure fracture pressure is determined based on the minimum horizontal stress. For example, closure fracture pressure may be equal to or related to the minimum horizontal stress. At block 216, well completion steps such as frac or perforation operations are determined based on the closure fracture pressure. More specifically, the location and/or spacing of perforations may be selected based on the determined closure fracture pressure.

Figure 6:
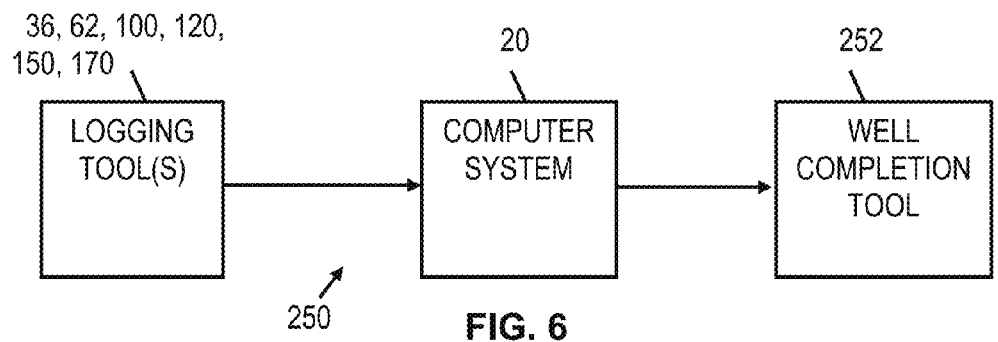
FIG. 6 shows a block diagram of a system for managing well completion operations.

FIG. 6 shows a block diagram of a system 250 for managing well completion operations. As shown, the system 250 includes logging tool(s) 36, 62, 100, 120, 150, 170 that provide log data to a computer system 20 as described herein. The computer system 20 executes software to obtain stiffness coefficients $C_{33}$, $C_{44}$, $C_{66}$, $C_{11}$, $C_{12}$, and $C_{13}$. In at least some embodiments, the computer system 20 obtains the stiffness coefficients $C_{33}$, $C_{44}$, $C_{66}$ from sonic log data, and derives $C_{11}$, $C_{12}$, and $C_{13}$ from Equations 8-10, where log data is used to determine at least some of the values for $k_3$-$k_{13}$, $k_{kerogen}$, and/or $k_{clay}$.

The computer system 20 also may derive values for $E_v$, $E_h$, $v_v$, $v_h$ a minimum horizontal stress, and a fracture closure pressure as described herein. With these values the computer system 20 may direct the operations of a well completion tool 252. For example, the well completion tool 252 may correspond to a fracturing tool, where the computer system 20 determines the location and spacing of fractures made by the fracturing tool in accordance with the fracture closure pressure estimates.

It should be understood that the timing of well completion operations performed by well completion tool 252 may occur soon after the log data is collected by logging tool(s) 36, 62, 100, 120, 150, 170 and/or soon after a downhole formation is characterized by the computer system 20 as described herein. Alternatively, the well completion operations performed may be performed hours, days, or some later time after the log data is collected by sonic logging tool(s) 36, 62, 100, 120, 150, 170 and/or after a downhole formation is characterized by the computer system 20.

Figure 7A:
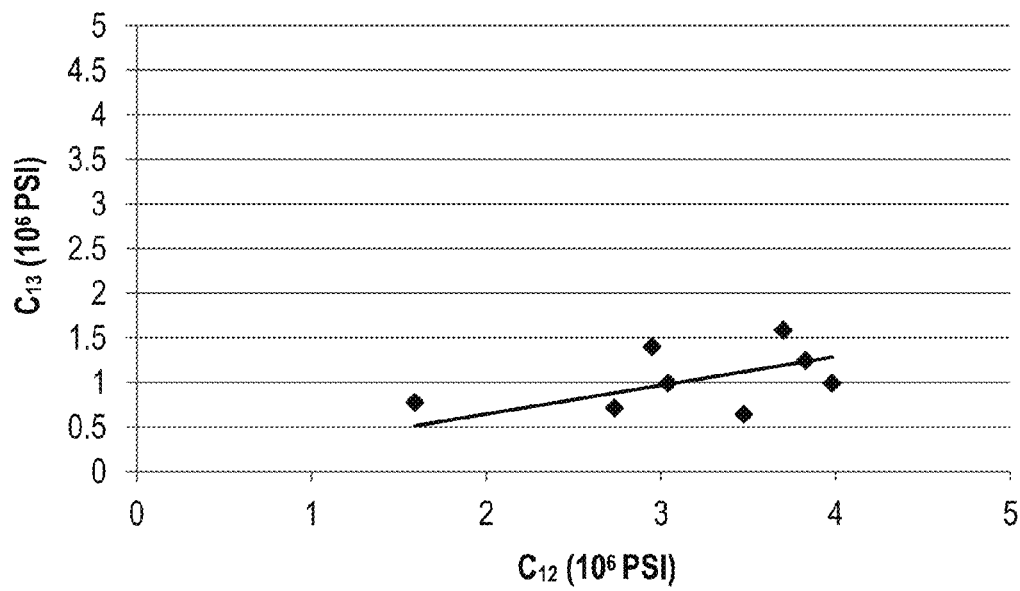
FIGS. 7A-7K show illustrative stiffness analysis charts.
Figure 7B:
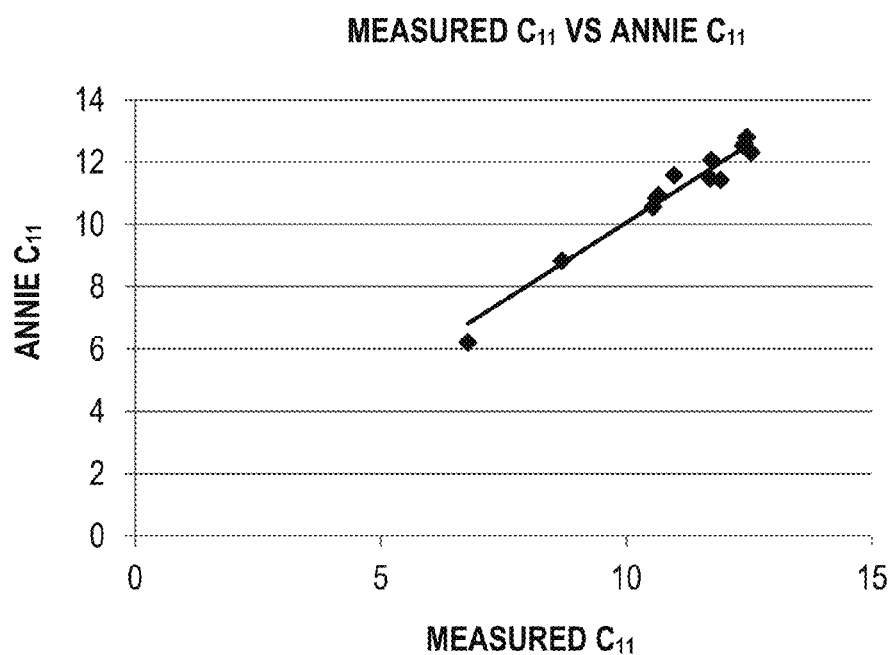
Figure 7C:
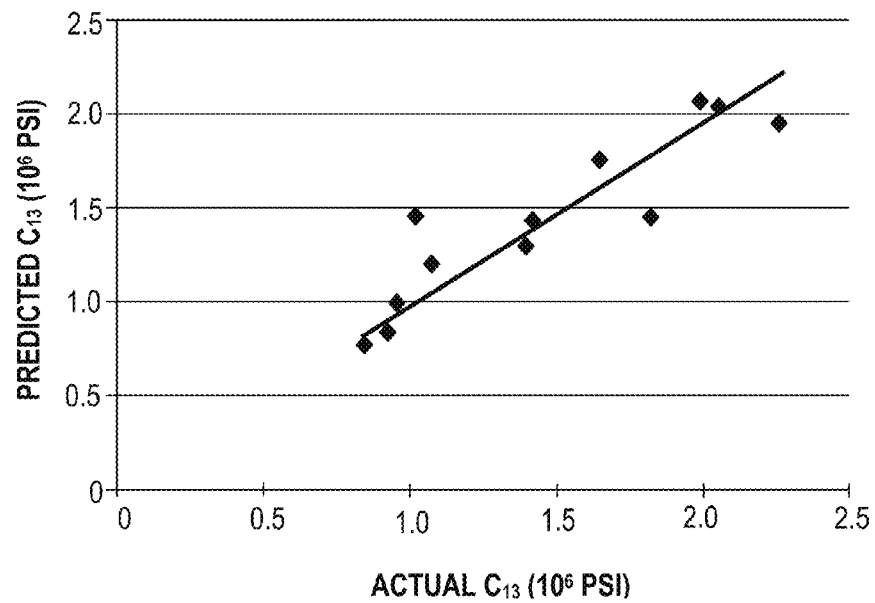

FIGS. 7A-7K show illustrative stiffness analysis charts. In FIG. 7A, a scatter plot of $C_{12}$ vs $C_{13}$ from an organic shale reservoir is represented. These stiffness coefficients can be computed, for example, from the measured tri-axial core compressional and shear velocities. As shown, the ANNIE model assumption that $C_{12}=C_{13}$ is not valid for the organic shale data corresponding to FIG. 7A. In FIG. 7B, a scatter plot of measured $C_{11}$ vs ANNIE $C_{11}$ (Equation 7) is represented. As shown, the ANNIE estimate for $C_{11}$ appears to be valid. Accordingly, the modified ANNIE model may estimate $C_{11}$ with $k_1=1$ and $k_2=0$ (see Equation 8). In FIG. 7C, a scatter plot of actual $C_{13}$ values vs $C_{13}$ values predicted from $C_{33}$, $C_{44}$, and kerogen are represented (e.g., see Equation 10d). Including kerogen in the calculation of $C_{13}$ improves the R-square in the prediction from 0.59 to 0.79 (compared to calculating $C_{13}$ using only $C_{33}$ and $C_{44}$).

Figure 7D:
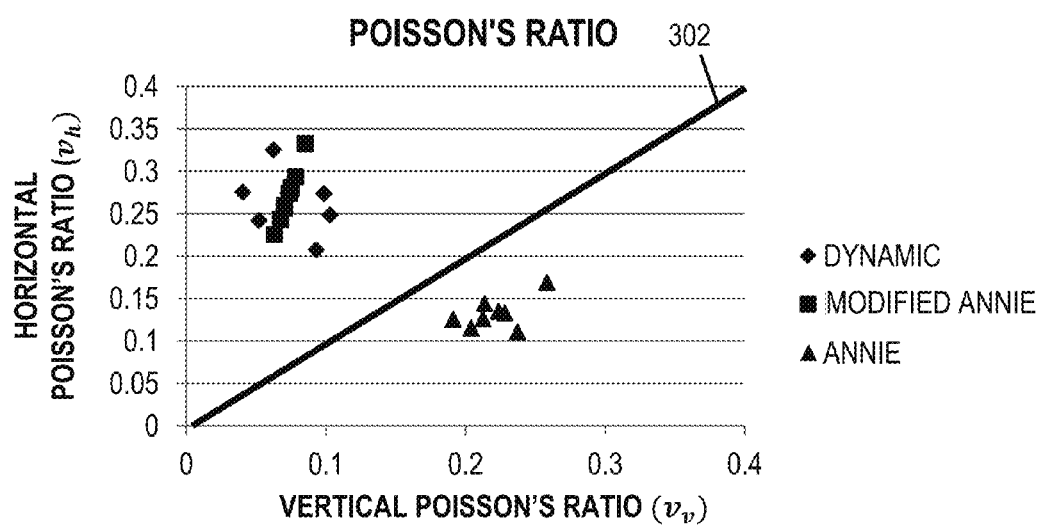

In FIG. 7D, a scatter plot of $v_v$ vs $v_h$ based on the ANNIE model, the modified ANNIE model, and the dynamic model (from core acoustic and density measurements) is represented, where line 302 corresponds to a slope of 1. As shown in FIG. 7D, the ANNIE model incorrectly predicts that $v_v$ is greater than $v_h$. As an example, the data points of FIG. 7D corresponding to the modified ANNIE model are determined in part using Equation 10a to determine a value for $C_{13}$ with $k_3=0.32$ and $k_4=0$. Alternatively, the data points of FIG. 7D corresponding to the modified ANNIE model are determined in part using Equation 10c to determine a value for $C_{13}$ with $k_8=0.32$ and with $k_9=k_{kerogen}=k_{clay}=0$. As previously mentioned, it should be noted that the values for constants in Equations 10a-10d may vary.

Figure 7E:
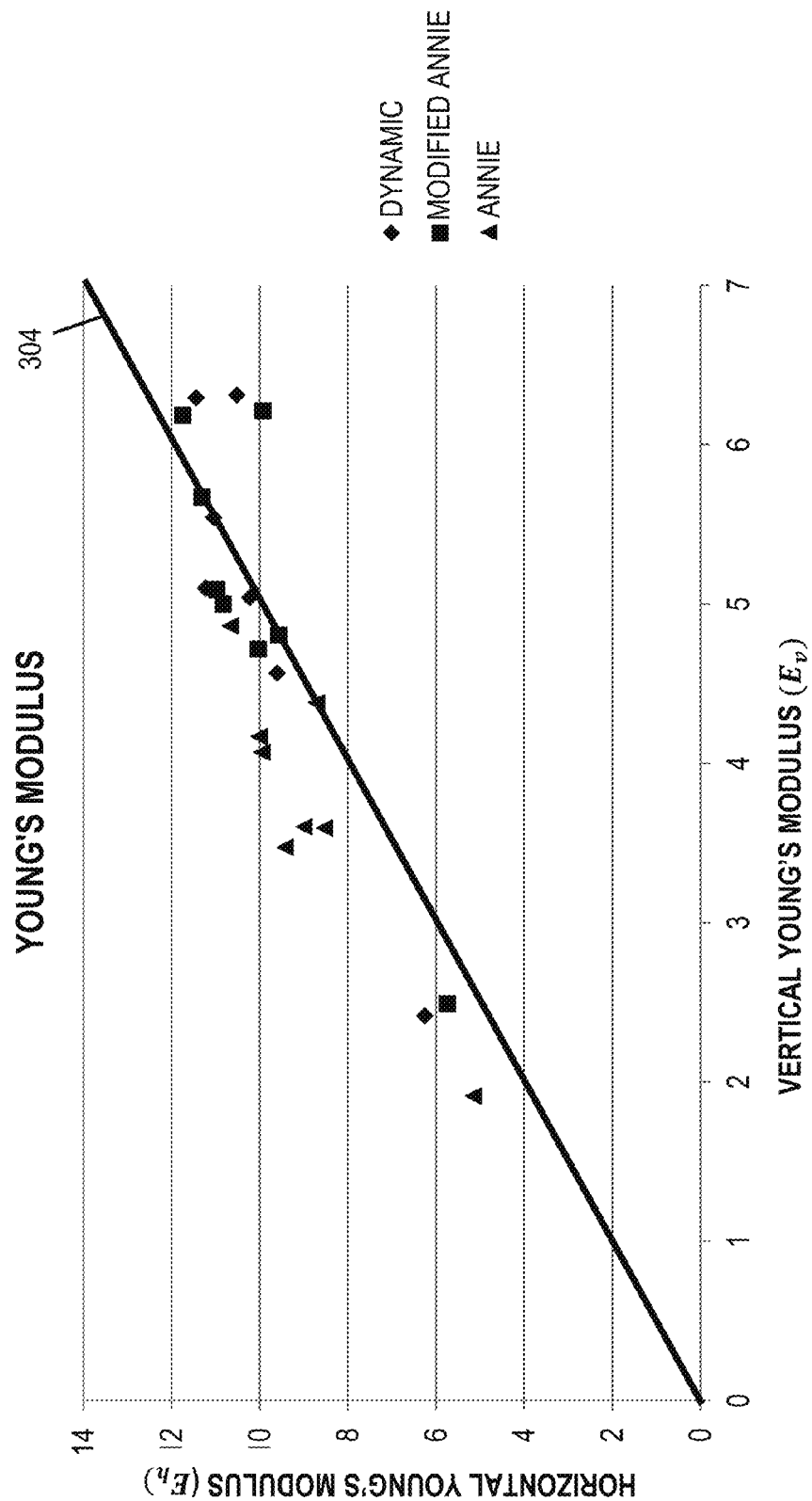

In FIG. 7E, a scatter plot of $E_v$ vs $E_h$ based on the ANNIE model, the modified ANNIE model, and the dynamic model is represented, where line 304 corresponds to a slope of $E_h/E_v=2$. In FIG. 7E, ANNIE provides the correct slope, but is off in magnitude relative to the dynamic moduli. As an example, the data points of FIG. 7E corresponding to the modified ANNIE model are determined in part using Equation 10a to determine a value for $C_{13}$ with $k_3=0.32$ and $k_4=0$. Alternatively, the data points of FIG. 7E corresponding to the modified ANNIE model are determined in part using Equation 10c to determine a value for $C_{13}$ with $k_8=0.32$ and with $k_9=k_{kerogen}=k_{clay}=0$. Again, it should be noted that the values for constants in Equations 10a-10d may vary.

Figure 7F:
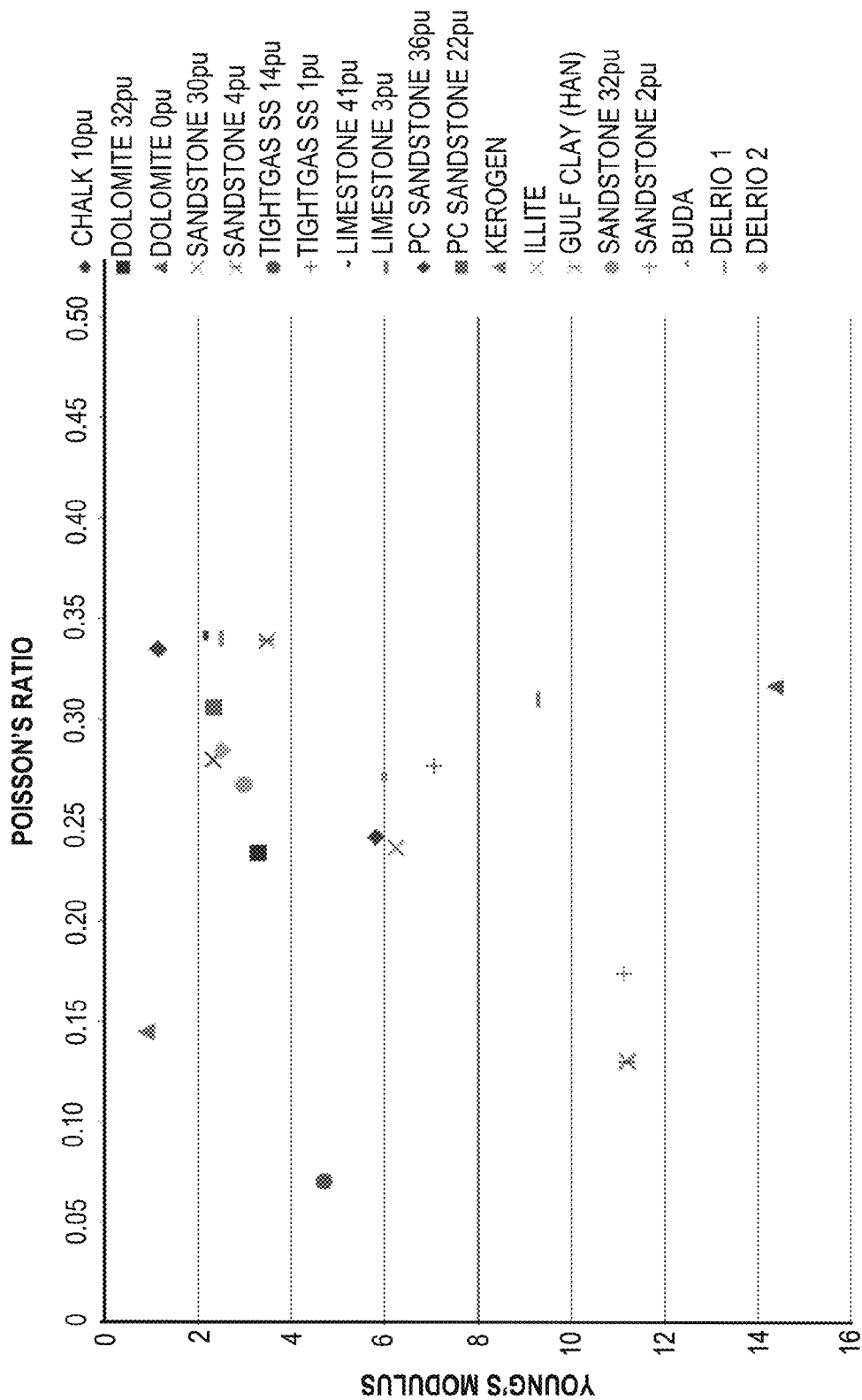
Figure 7G:
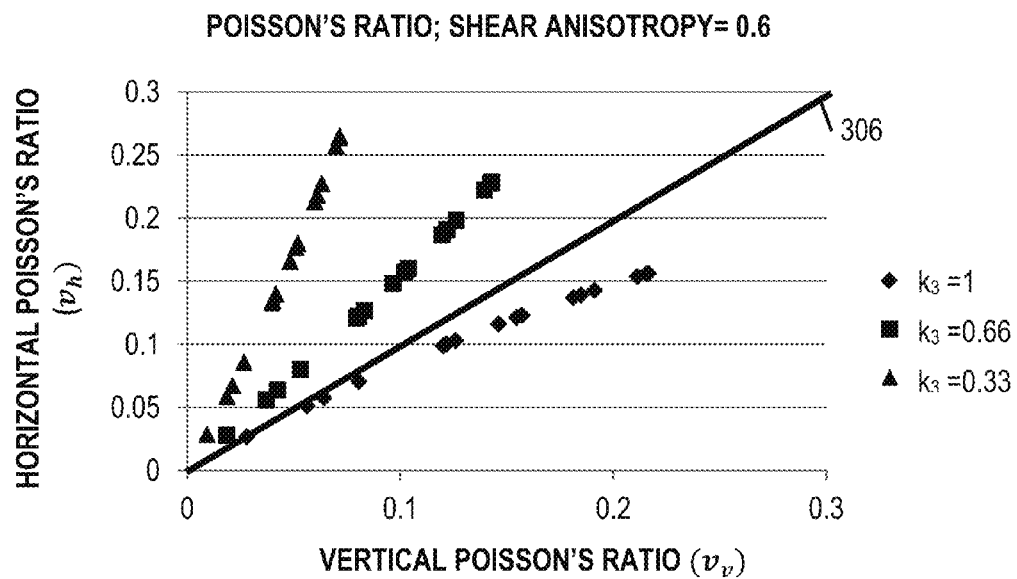

FIG. 7F represents isotropic (assumes no difference between the vertical and horizontal velocities) Poisson's Ratio and Shear Modulus based on bulk density, compressional, and shear sonic data. Meanwhile, FIG. 7G shows the effect varying $k_3$ on the data set of FIG. 7F. For FIG. 7G, a constant shear anisotropy ratio of 0.6 is imposed. In FIG. 7G, a scatter plot of $v_v$ vs $v_h$ for the three cases $k_3=1$ (ANNIE Model), $k_3=0.66$, and $k_3=0.33$ is represented (see $k_3$ in Equation 10a). The line 306 corresponds to the slope $v_h/v_v=1$. It can be seen in FIG. 7G that as $k_3$ decreases, $v_h$ increases and $v_v$ decreases, or the $v_h/v_v$ ratio increases.

Figure 7H:
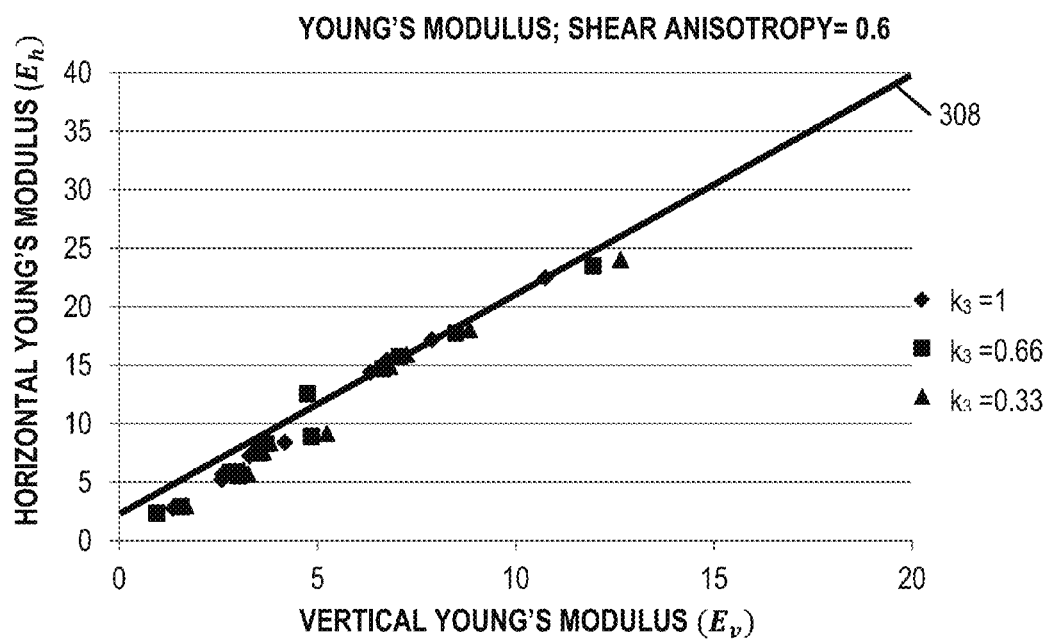

FIG. 7H represents a scatter plot of $E_v$ vs $E_h$ for the three cases $k_3=1$ (ANNIE Model), $k_3=0.66$, and $k_3=0.33$ (see $k_3$ in Equation 10a). In FIG. 7H, line 308 corresponds to the slope $E_h E_v=2$. It can be seen in FIG. 7G that as $k_3$ decreases, there is a very small reduction in $E_h$ and $E_v$, and the $E_h/E_v$ ratio remains approximately constant. It is noted that the constant $E_h/E_v$ ratio is a result of the imposition of a constant shear anisotropy ratio.

Figure 7I:
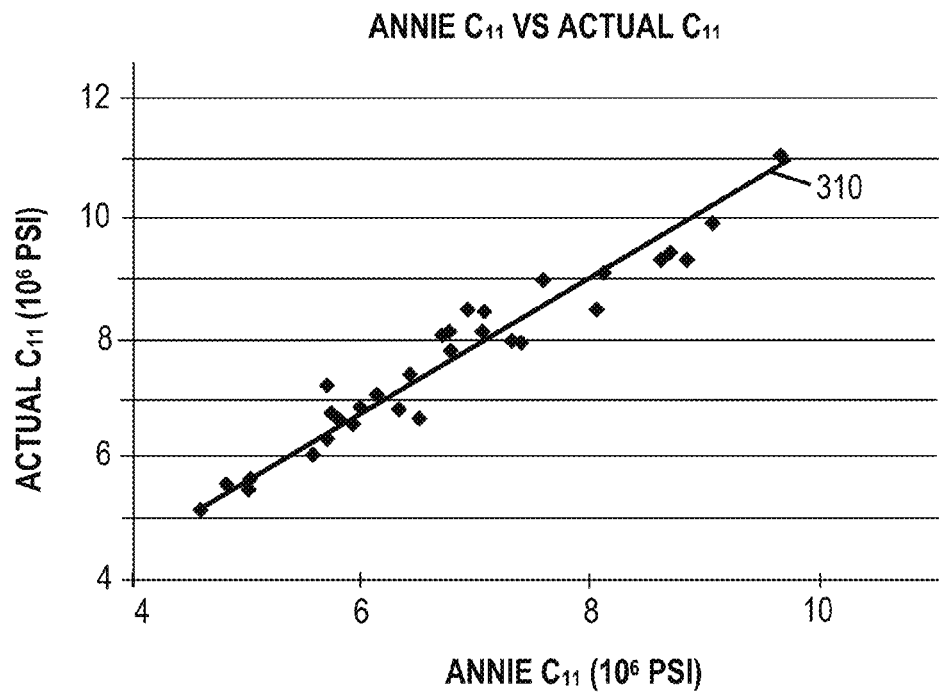

In FIG. 7I, a scatter plot of ANNIE $C_{11}$ values vs actual $C_{11}$ values is represented for example shale data. In FIG. 7I, the ANNIE model values for $C_{11}$ (provided by Equation 7) need to be multiplied by a constant as suggested in Equation 8 to remove bias. This constant is represented by the slope of line 310 and corresponds to 1.12 for the example shale data of FIG. 7I.

Figure 7J:
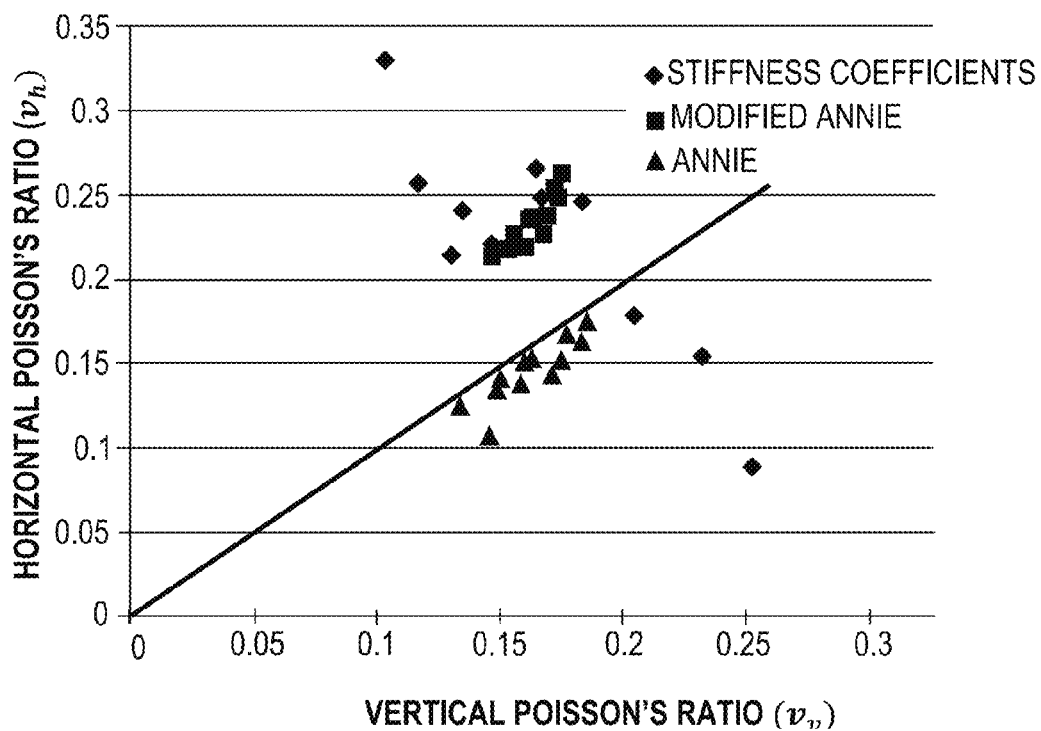

In FIG. 7J, a scatter plot of $v_v$ vs $v_h$ based on the ANNIE model, the modified ANNIE model, and actual stiffness coefficients is represented. For FIG. 7J, the modified ANNIE data points are obtained using Equations 8, 9, and 10a, where $k_1=1.12$, $k_2=0$, $k_3=0.76$, and $k_4=0$. From FIG. 7J, it may be noted that with the assumption $C_{13}=0.76C_{12}$, a linear relationship between $v_v$ and $v_h$ is imposed.

Figure 7K:
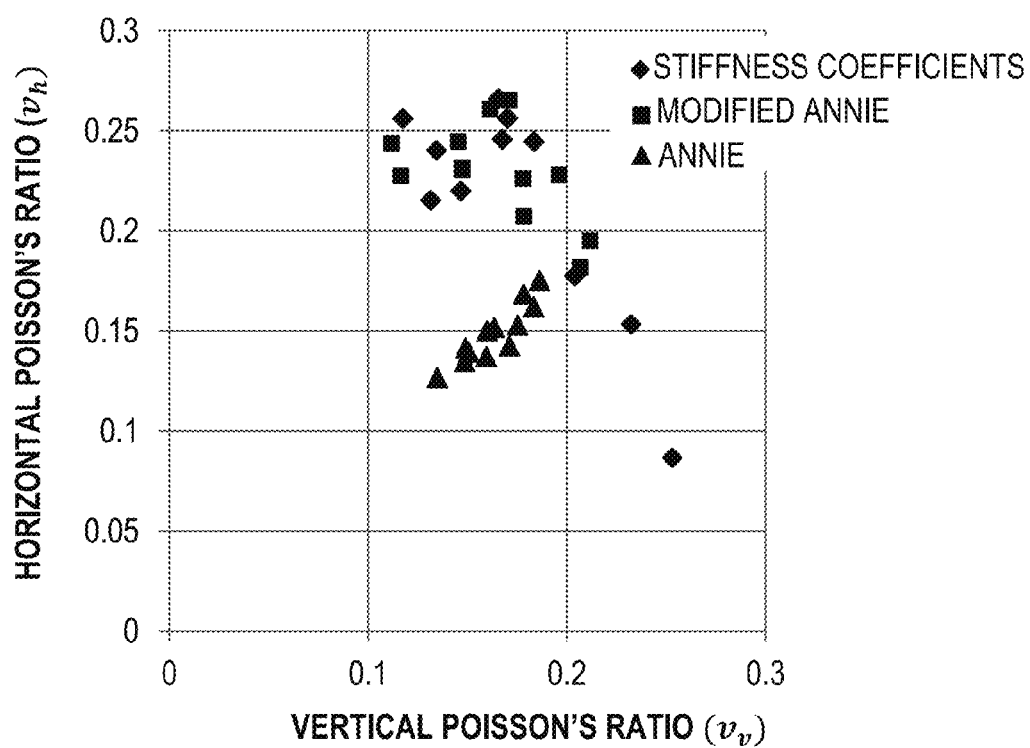

In FIG. 7K, a scatter plot of $v_v$ vs $v_h$ based on the ANNIE model, the modified ANNIE model, and actual stiffness coefficients is represented. For FIG. 7K, the modified ANNIE data points are obtained using Equations 8, 9, and 10d with example constant values: $k_1=1.12$, $k_2=0$, $k_{10}=1.05$, $k_{11}=-2.88$, $k_{12}=0$, $k_{13}=2.44$, $k_{kerogen}=-4.04$, and $k_{clay}=0$. From FIG. 7K, it may be noted that the relationship between $v_v$ and $v_h$ is not linear and the modified ANNIE data points compare more closely to the scatter of the actual stiffness coefficient data points.

Embodiments disclosed herein include:

A: A method that comprises obtaining log data of a downhole formation and characterizing the downhole formation by determining stiffness coefficients including $C_{33}$, $C_{44}$, $C_{66}$, $C_{11}$, $C_{12}$, and $C_{13}$. $C_{33}$, $C_{44}$, and $C_{66}$ are derived from the sonic log data. $C_{13}$ is a function of $C_{33}$, $C_{44}$, $C_{66}$, and at least one of a kerogen volume and a clay volume derived from the log data.

B: A method that comprises obtaining log data of a downhole formation and characterizing the downhole formation by determining stiffness coefficients including $C_{33}$, $C_{44}$, $C_{66}$, $C_{11}$, $C_{12}$, and $C_{13}$. $C_{33}$, $C_{44}$, and $C_{66}$ are derived from the sonic log data. $C_{11}$ and $C_{12}$ are derived from $C_{33}$, $C_{44}$, and $C_{66}$. $C_{13}$ is derived based at least in part on $C_{11}$ calculated as $C_{11}=k_1[C_{33}+2(C_{66}-C_{44})]+k_2$, where $k_1$ and $k_2$ are predetermined constants.

C: A system that comprises a processing unit and a memory coupled to the processing unit. The memory stores software that, when executed, causes the processing unit to obtain log data of a downhole formation and to characterize the downhole formation by determining stiffness coefficients including $C_{33}$, $C_{44}$, $C_{66}$, $C_{11}$, $C_{12}$, and $C_{13}$. $C_{33}$, $C_{44}$, and $C_{66}$ are derived from the log data. $C_{11}$ and $C_{12}$ are derived from $C_{33}$, $C_{44}$ and $C_{66}$. $C_{13}$ is derived in part from at least one of $C_{11}$ calculated as $C_{11}=k_1[C_{33}+2(C_{66}-C_{44})]+k_2$, a kerogen volume derived from the log data, and a clay volume derived from the log data, where $k_1$ and $k_2$ are predetermined constants.

Each of the embodiments, A, B and C, may have one or more of the following additional elements in any combination. Element 1: $C_{33}$, $C_{44}$, and $C_{66}$ are derived from sonic log data, and wherein the kerogen or clay volumes are derived at least in part from at least one of nuclear log data, magnetic resonance log data, and resistivity log data. Element 2: $C_{11}$ is a value represented by $C_{11}=C_{33}+2(C_{66}-C_{44})$ or $C_{11}=k_1[C_{33}+2(C_{66}-C_{44})]+k_2$, where $k_1$ and $k_2$ are predetermined constants. Element 3: further comprising selecting one of $C_{11}=C_{33}+2(C_{66}-C_{44})$ or $C_{11}=k_1[C_{33}+2(C_{66}-C_{44})]+k_2$ based on a trust criterion. Element 4: $C_{13}$ is a value represented by $C_{13}=k_3(C_{11}-2C_{66})+k_4$, $C_{13}=k_5C_{33}+k_6C_{44}+k_7C_{66}$, $C_{13}=k_8(C_{11}-2C_{66})+k_9+k_{kerogen}V_{kerogen}+k_{clay}V_{clay}$, or $C_{13}=k_{10}C_{33}+k_{11}C_{44}+k_{12}C_{66}+k_{13}+k_{kerogen}V_{kerogen}+k_{clay}V_{clay}$, where $k_3$ to $k_{13}$, $k_{kerogen}$, and $k_{clay}$ are predetermined constants, $V_{kerogen}$ is a predetermined kerogen volume, and $V_{clay}$ is a predetermined clay volume. Element 5: further comprising selecting one of $C_{13}=k_3(C_{11}-2C_{66})+k_4$, $C_{13}=k_5C_{33}+k_6C_{44}+k_7C_{66}$, $C_{13}=k_8(C_{11}-2C_{66})+k_9+k_{kerogen}V_{kerogen}+k_{clay}V_{clay}$, or $C_{13}=k_{10}C_{33}+k_{11}C_{44}+k_{12}C_{66}+k_{13}+k_{kerogen}V_{kerogen}+k_{clay}V_{clay}$ based on a trust criterion. Element 6: further comprising characterizing the downhole formation by determining a vertical Young's Modulus value and a horizontal Young's Modulus value from at least some of the stiffness coefficients. Element 7: further comprising characterizing the downhole formation by determining a vertical Poisson's Ratio value and a horizontal Poisson's Ratio value from at least some of the stiffness coefficients. Element 8: further comprising characterizing the downhole formation by determining a minimum horizontal stress value from at least some of the stiffness coefficients. Element 9: further comprising determining a facture closure pressure from the minimum horizontal stress value. Element 10: further comprising controlling a well completion operation based on the characterized downhole formation. Element 11: the well completion operation corresponds to a fracturing operation.

Element 12: $C_{13}$ is a value represented by $C_{13}=k_3(C_{11}-2C_{66})+k_4$, or $C_{13}=k_8(C_{11}-2C_{66})+k_9+k_{kerogen}V_{kerogen}+k_{clay}V_{clay}$, where $k_3$, $k_4$, $k_8$, $k_9$, $k_{kerogen}$, and $k_{clay}$ are predetermined constants, $V_{kerogen}$ is a predetermined kerogen volume, and $V_{clay}$ is a predetermined clay volume. Element 13: $C_{13}$ is a value represented by $C_{13}=k_{10}C_{33}+k_{11}C_{44}+k_{12}C_{66}+k_{13}+k_{kerogen}V_{kerogen}+k_{clay}V_{clay}$, where $k_{10}$, $k_{11}$, $k_{12}$, $k_{13}$, $k_{kerogen}$, and $k_{clay}$ are predetermined constants, $V_{kerogen}$ is a predetermined kerogen volume, and $V_{clay}$ is a predetermined clay volume. Element 14: further comprising characterizing the downhole formation by determining a vertical Young's Modulus value, a horizontal Young's Modulus value, a vertical Poisson's Ratio value, and a horizontal Poisson's Ratio value from at least some of the stiffness coefficients. Element 15: determining a minimum horizontal stress value based on the vertical Young's Modulus value, the horizontal Young's Modulus value, the vertical Poisson's Ratio value, and the horizontal Poisson's Ratio value; and determining a facture closure pressure from the minimum horizontal stress value. Element 16: further comprising controlling a well completion operation based on the characterized downhole formation.

Element 17: the processing unit further characterizes the downhole formation by determining a vertical Young's Modulus value, a horizontal Young's Modulus value, a vertical Poisson's Ratio value, and a horizontal Poisson's Ratio value from at least some of the stiffness coefficients. Element 18: the processing unit further characterizes the downhole formation by determining a minimum horizontal stress value or a fracture closure pressure based in part on some of the stiffness coefficients. Element 19: further comprising a well completion tool in communication with the processing unit, wherein the processing unit directs the well completion tool to perform an operation based on the characterized downhole formation. Element 20: the well completion tool comprises a fracturing tool. Element 21: further comprising at least one of a sonic logging tool, a nuclear logging tool, a magnetic resonance logging tool, and a resistivity logging tool that collects the log data during logging while drilling (LWD) operations. Element 22: further comprising at least one of a sonic logging tool, a nuclear logging tool, a magnetic resonance logging tool, and a resistivity logging tool that collects the log data during wireline logging operations.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method, comprising:
    deploying at least one logging tool in a borehole to obtain log data of a downhole formation, wherein the at least one logging tool comprises a sonic logging tool having at least one acoustic transmitter and at least one acoustic receiver spaced from the at least one acoustic transmitter;
    characterizing, by a processor, the downhole formation by determining stiffness coefficients including $C_{33}$, $C_{44}$, $C_{66}$, $C_{11}$, $C_{12}$, and $C_{13}$, wherein $C_{13}$ is a function of $C_{33}$, $C_{44}$, $C_{66}$, and at least one of a kerogen volume and a clay volume derived from the log data;

wherein $C_{44}$ and $C_{66}$ are derived from sonic log data obtained by the sonic logging tool, and wherein $C_{33}$ is a value represented by $C_{33}=((C_{11}-k_2)/k_1)-2(C_{66}-C_{44})$, where $k_1$ and $k_2$ are predetermined constants not equal to zero;

outputting, by an output device, the determined stiffness coefficients to represent the characterized downhole formation; and performing hydraulic fracturing using a fracturing tool and stress values determined from at least some of the stiffness coefficients.

2. The method of claim 1, wherein $C_{33}$, $C_{44}$, and $C_{66}$ are derived from sonic log data, and wherein the kerogen or clay volumes are derived at least in part from at least one of nuclear log data, magnetic resonance log data, and resistivity log data.

3. The method of claim 1, wherein $C_{11}$ is a value represented by $C_{11}=C_{33}+2(C_{66}-C_{44})$ or $C_{11}=k_1[C_{33}+2(C_{66}-C_{44})]+k_2$, where $k_1$ and $k_2$ are predetermined constants not equal to zero.

4. The method of claim 1, further comprising selecting one of $C_{11}=C_{33}+2(C_{66}-C_{44})$ or $C_{11}=k_1[C_{33}+2(C_{66}-C_{44})]+k_2$ based on a trust criterion.

5. The method of claim 1, $C_{13}$ is a value represented by $C_{13}=k_3(C_{11}-2C_{66})+k_4$, $C_{13}=k_5C_{33}+k_6C_{44}+k_7C_{66}$, $C_{13}=k_8(C_{11}-2C_{66})+k_9+k_{kerogen}V_{kerogen}+k_{clay}V_{clay}$, or $C_{13}=k_{10}C_{33}+k_{11}C_{44}+k_{12}C_{66}+k_{13}+k_{kerogen}V_{kerogen}+k_{clay}V_{clay}$, where $k_3$ to $k_{13}$, $k_{kerogen}$, and $k_{clay}$ are predetermined constants, $V_{kerogen}$ is a predetermined kerogen volume, and $V_{clay}$ is a predetermined clay volume.

6. The method of claim 5, further comprising selecting one of $C_{13}=k_3(C_{11}-2C_{66})+k_4$, $C_{13}=k_5C_{33}+k_6C_{44}+k_7C_{66}$, $C_{13}=k_8(C_{11}-2C_{66})+k_9+k_{kerogen}V_{kerogen}+k_{clay}V_{clay}$, or $C_{13}=k_{10}C_{33}+k_{11}C_{44}+k_{12}C_{66}+k_{13}+k_{kerogen}V_{kerogen}+k_{clay}V_{clay}$ based on a trust criterion.

7. The method of claim 1, further comprising characterizing the downhole formation by determining a vertical Young's Modulus value, a horizontal Young's Modulus value, a vertical Poisson's Ratio value, and a horizontal Poisson's Ratio value from at least some of the stiffness coefficients.

8. The method of claim 1, further comprising characterizing the downhole formation by determining a minimum horizontal stress value from at least some of the stiffness coefficients.

9. The method of claim 8, further comprising determining a fracture closure pressure from the minimum horizontal stress value.

10. The method of claim 1, further comprising controlling a well completion operation based on the characterized downhole formation.

11. The method of claim 10, wherein the well completion operation corresponds to a fracturing operation.

12. A method, comprising:

deploying at least one logging tool in a borehole to obtain log data of a downhole formation, wherein the at least one logging tool comprises a sonic logging tool having at least one acoustic transmitter and at least one acoustic receiver spaced from the at least one acoustic transmitter;

characterizing, by a processor, the downhole formation by determining stiffness coefficients including $C_{33}$, $C_{44}$, $C_{66}$, $C_{11}$, $C_{12}$, and $C_{13}$, wherein sonic log data obtained by the sonic logging tool is used to determine at least one of the stiffness coefficients;

wherein $C_{13}$ is derived from $C_{11}$ calculated as $C_{11}=k_1[C_{33}+2(C_{66}-C_{44})]+k_2$ or $C_{33}$ calculated as $C_{33}=((C_{11}-k_2)/k_1)-2(C_{66}-C_{44})$, where $k_1$ and $k_2$ are predetermined constants not equal to zero; and outputting, by an output device, the determined stiffness coefficients to represent the characterized downhole formation; and performing hydraulic fracturing using a fracturing tool and stress values determined from at least some of the stiffness coefficients.

13. The method of claim 12, wherein $C_{13}$ is a value represented by $C_{13}=k_3(C_{11}-2C_{66})+k_4$, or $C_{13}=k_8(C_{11}-2C_{66})+k_9+k_{kerogen}V_{kerogen}+k_{clay}V_{clay}$, where $k_3$, $k_4$, $k_8$, $k_9$, $k_{kerogen}$, and $k_{clay}$ are predetermined constants not equal to zero, $V_{kerogen}$ is a predetermined kerogen volume, and $V_{clay}$ is a predetermined clay volume.

14. The method of claim 12, wherein $C_{13}$ is a value represented by $C_{13}=k_{10}C_{33}+k_{11}C_{44}+k_{12}C_{66}+k_{13}+k_{kerogen}V_{kerogen}+k_{clay}V_{clay}$, where $k_{10}$, $k_{11}$, $k_{12}$, $k_{13}$, $k_{kerogen}$, and $k_{clay}$ are predetermined constants not equal to zero, $V_{kerogen}$ is a predetermined kerogen volume, and $V_{clay}$ is a predetermined clay volume.

15. The method of claim 12, further comprising characterizing the downhole formation by determining a vertical Young's Modulus value, a horizontal Young's Modulus value, a vertical Poisson's Ratio value, and a horizontal Poisson's Ratio value from at least some of the stiffness coefficients.

16. The method of claim 15, further comprising:

determining a minimum horizontal stress value based on the vertical Young's Modulus value, the horizontal Young's Modulus value, the vertical Poisson's Ratio value, and the horizontal Poisson's Ratio value; and determining a fracture closure pressure from the minimum horizontal stress value.

17. The method of claim 12, further comprising controlling a well completion operation based on the characterized downhole formation.

18. A system, comprising:

at least one logging tool deployed in a borehole to obtain log data of a downhole formation, wherein the at least one logging tool comprises a sonic logging tool having at least one acoustic transmitter and at least one acoustic receiver spaced from the at least one acoustic transmitter;

a processing unit; and a memory coupled to the processing unit, wherein the memory stores the log data and software that, when executed, causes the processing unit to:

characterize the downhole formation by determining stiffness coefficients including $C_{33}$, $C_{44}$, $C_{66}$, $C_{11}$, $C_{12}$, and $C_{13}$, wherein sonic log data obtained by the sonic logging tool is used to determine at least one of the stiffness coefficients, wherein $C_{13}$ is derived in part from at least one of a kerogen volume derived from the log data and a clay volume derived from the log data, and from at least one of $C_{11}$ calculated as $C_{11}=k_1[C_{33}+2(C_{66}-C_{44})]+k_2$ and $C_{33}$ calculated as $C_{33}=((C_{11}-k_2)/k_1)-2(C_{66}-C_{44})$, where $k_1$ and $k_2$ are predetermined constants not equal to zero; and an output device that outputs the determined stiffness coefficients to represent the characterized downhole formation; and a fracturing tool that performs hydraulic fracturing using stress values determined from at least some of the stiffness coefficients.

19. The system of claim 18, wherein the processing unit further characterizes the downhole formation by determining a vertical Young's Modulus value, a horizontal Young's Modulus value, a vertical Poisson's Ratio value, and a horizontal Poisson's Ratio value from at least some of the stiffness coefficients.

20. The system of claim 18, wherein the processing unit further characterizes the downhole formation by determining a minimum horizontal stress value or a fracture closure pressure based in part on some of the stiffness coefficients.

21. The system of claim 18, further comprising a well completion tool in communication with the processing unit, wherein the processing unit directs the well completion tool to perform an operation based on the characterized downhole formation.

22. The system of claim 21, wherein the well completion tool comprises a fracturing tool.

23. The system of claim 18, further comprising at least one of a nuclear logging tool, a magnetic resonance logging tool, and a resistivity logging tool that collects the log data during logging while drilling (LWD) operations.

24. The system of claim 18, further comprising at least one of a nuclear logging tool, a magnetic resonance logging tool, and a resistivity logging tool that collects the log data during wireline logging operations.

* * * * *